(12) United States Patent
Buzon et al.

(10) Patent No.: US 10,865,938 B2
(45) Date of Patent: Dec. 15, 2020

(54) SPACER PARTS CARRYING ELEMENT

(71) Applicant: BUZON PEDESTAL INTERNATIONAL, Herstal (BE)

(72) Inventors: Laurent Buzon, Herstal (BE); Claude Buzon, Herstal (BE); Patrick Felten, Herstal (BE)

(73) Assignee: Buzon Pedestal International, Herstal (BE)

( * ) Notice: Subject to any disclaimer, the term of this patent is extended or adjusted under 35 U.S.C. 154(b) by 0 days.

(21) Appl. No.: 15/843,664

(22) Filed: Dec. 15, 2017

(65) Prior Publication Data
US 2018/0172203 A1 Jun. 21, 2018

(30) Foreign Application Priority Data

Dec. 15, 2016 (BE) .................................. 2016/00183

(51) Int. Cl.
*F16M 11/24* (2006.01)
*E04F 15/024* (2006.01)

(52) U.S. Cl.
CPC ......... *F16M 11/24* (2013.01); *E04F 15/0247* (2013.01)

(58) Field of Classification Search
CPC ..... F16M 11/24; E04F 15/0247; Y10T 403/60
USPC ............ 411/45, 46, 47, 48; 52/126.1, 126.5, 52/126.6, 126.7, 263
See application file for complete search history.

(56) References Cited

U.S. PATENT DOCUMENTS

| | | | | |
|---|---|---|---|---|
| 6,481,942 B2 * | 11/2002 | Tanaka | ................. | F16B 19/1081 411/41 |
| 6,616,479 B1 * | 9/2003 | Jones | ................. | F16B 19/1081 411/48 |
| 8,302,356 B2 * | 11/2012 | Knight, III | ............ | E04D 11/007 52/126.7 |
| 8,381,461 B2 * | 2/2013 | Repasky | ............... | E04D 11/007 52/126.1 |
| 8,387,317 B2 * | 3/2013 | Kugler | .............. | E04F 15/02183 52/100 |
| 8,453,391 B2 * | 6/2013 | Tabibnia | ........... | E04F 15/02452 248/188.2 |
| 8,490,342 B2 * | 7/2013 | Greaves | ............ | E04F 15/02482 248/346.01 |
| D733,528 S * | 7/2015 | Lee | ................................ | D8/354 |

(Continued)

FOREIGN PATENT DOCUMENTS

DE 3009004 A * 10/1980
FR 2624537 A1 * 6/1989 ........... E04D 11/007
(Continued)

*Primary Examiner* — Kimberly T Wood
(74) *Attorney, Agent, or Firm* — Jacobson Holman PLLC

(57) ABSTRACT

Spacer parts carrying element provided for being mounted on a pedestal, which carrying element comprises a plate having an upper face and a lower face, said lower face being provided with a set of legs provided for gripping into an opening applied in a carrying surface of the pedestal, said legs of said set being applied around a perforation extending from the upper towards the lower face, each leg comprises a base part and a head part connected among each other by an intermediate part, the head part having a width inferior to the one of the base part, the head part having a width superior to the one of the intermediate part, the head part extending along a border of a space extending in an extension of the perforation.

12 Claims, 2 Drawing Sheets

(56) References Cited

U.S. PATENT DOCUMENTS

2013/0219809 A1* 8/2013 Tabibnia ........... E04F 15/02464
                                                    52/126.6
2016/0040439 A1* 2/2016 Pelc ................. E04F 15/02452
                                                    52/126.6

FOREIGN PATENT DOCUMENTS

FR          2702506 A1 * 9/1994  ........ E04F 15/02476
WO          99/23327      5/1991

* cited by examiner

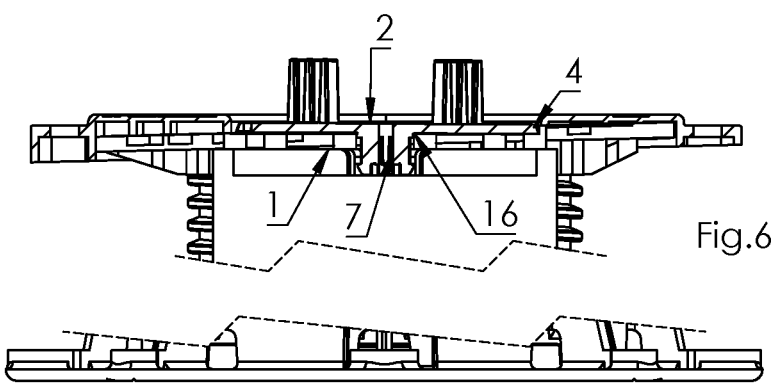

SPACER PARTS CARRYING ELEMENT

BACKGROUND OF THE INVENTION

The present invention relates to a spacer parts carrying element provided for being mounted on a pedestal for raising a surface, which carrying element comprises a plate having an upper face and a lower face, said spacer parts being placed on the upper face in such a manner as to extend upwards as from this upper face, said lower face being provided with a set of legs provided for gripping into an opening applied in a carrying surface of the pedestal, said legs of said set being applied around a perforation extending from the upper towards the lower face.

Such a spacer parts carrying element is known from the patent application WO 99/23327 and is marketed by the applicant. The spacer parts carrying element is provided for being mounted on a pedestal for raising a surface, which pedestal himself serves, among others, for compensating an inclination of the surface on which the pedestal is placed. The spacer parts are placed on the upper face of the carrying element, in such a manner as to extend upwards as from this upper face. The spacer parts can thus be lodged in a space between two adjacent tiles applied on the upper surface of the pedestal. The spacer parts thus maintain a distance between two adjacent tiles. The set off legs will cross the opening applied in the support surface of the pedestal and thus enable to fix the carrying element on the pedestal.

A drawback of the known carrying element is that in case of heavy wind blasts, for example in the range of 80 km/h or more, the carrying element can loose from the pedestal and can thus disturb the positioning of the tiles on the pedestal.

It is an object of the invention to realise a spacer parts carrying element which can be better fixed on the pedestal and thus reduces the probability that it loses in case of heavy wind blasts.

To this purpose a spacer parts carrying element according to the invention is characterised in that each leg comprises a base part and a head part connected among each other by an intermediate part, the head part having a width (L1) smaller than the one (L2) of the base part, the head part having a width larger than the one (L3) of the intermediate part, the head part extending along a border of a space extending in an extension of the perforation. The fact that the head part extends along a border of a space, which extends in the extension of the perforation, enables a fixing screw, which would be screwed into the perforation as from the upper face of the plate, to grip in that head part of each leg. Because the intermediate part has a width smaller than the one of the head part, this will enable the head part to pivot with respect to the base part when the fixing screw will penetrate within that space. Indeed, the force transmitted to the head part by the fixing screw when moving within this space situated in the extension of the perforation, will on its turn be transmitted at the intermediate part. The smaller width of this intermediate part will enable, under the effect of this force, a hinging of the head parts and the intermediate parts. This hinging will have as consequence that the legs will spread in order to occupy a larger volume under the lower face of the carrying element and thus will oppose a pulling away of carrying element from the pedestal on which it will be fixed.

A first preferred embodiment of a spacer parts carrying element according to the invention is characterised in that the head part comprises a first circumference having a first segment, a second segment and a third segment, the first segment facing said space, which first segment comprises a curved profile matching the one of said space, a first end of said first segment being connected by means of a first liaison segment to the second segment, a second end of the first segment, opposite the first end, is connected to the third segment by means of a second liaison segment. The curved profile of the first segment can thus be aligned with the space situated in the extension of the perforation and will enable to the fixing screw to correctly grip in the head part.

A second embodiment of a spacer parts carrying element according to the invention is characterised in that the base part comprises a second circumference having a fourth segment, a fifth segment and a sixth segment, the fourth segment forms an exterior border of the leg, a first end of the fourth segment being connected by means of a third liaison segment to the fifth segment, a second end of the fourth segment, opposite to the first end, being connected to the sixth segment by a fourth liaison segment. This facilitates the penetration of the carrying element into the perforation.

Preferably each leg has a length situated between 0.7 and 1.2 cm, in particular 1 cm. This enables a sufficient contact surface with the fixing screw.

The invention will now be described in more details with respect to the drawings illustrating an embodiment of a spacer parts carrying element provided for being mounted on a pedestal for raising a surface. In the drawings:

BRIEF DESCRIPTION OF THE DRAWINGS

FIG. 6 shows a cross section along the line VI-VI' of FIG. 1.

Figure 1:
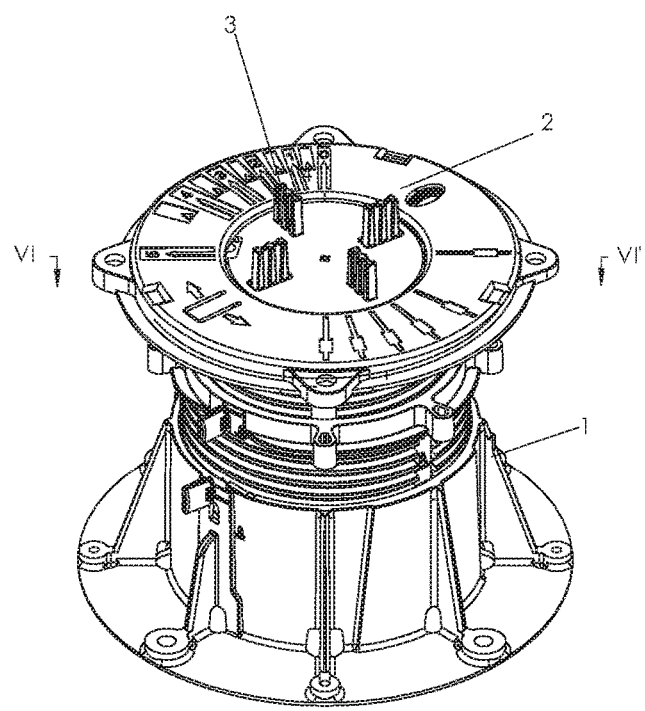
FIG. 1 shows a pedestal for raising a surface provided with a spacer parts carrying element.

In the drawings a same reference sign has been allotted to a same or analogous element.

DETAILED DESCRIPTION OF THE INVENTION

FIG. 1 shows a pedestal 1 for raising a surface and provided with a spacer parts 3 carrying element 2. The spacer parts carrying element comprises a plate 4 and is provided for being detachably mounted on the pedestal. It serves to maintain a distance between tiles (not shown in the figure) and of which a corner rests on the pedestal 1. The carrying element preferably comprises four spacer parts 3 as generally corners of four tiles will be placed on the pedestal. The spacer parts are placed on the upper face 5 (see FIG. 2) of the plate of the carrying element in such a manner as to extend upwards as from this upper face. Thus, the spacer parts can extend in a space between two adjacent tiles of which a corner is placed on the pedestal and serve for maintaining the distance between those adjacent tiles.

Figure 2:
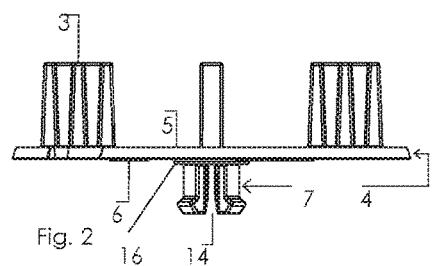
FIG. 2 shows a side view of a spacer parts carrying element according to the invention.
Figure 3:
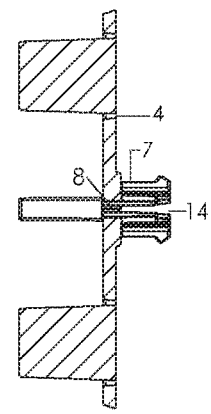
FIG. 3 shows a cross-section view through a spacer parts carrying element according to the invention.

As illustrated in FIG. 2, the carrying element also comprises a lower face 6 which is provided with a set of legs 7 provided for crossing an opening applied in the support surface of the pedestal. The legs of the set of legs are applied around a perforation 8 (see FIG. 3), which extends from the upper face towards the lower face of the plate. Preferably the set of legs comprises four legs.

Preferably the set of legs is placed on a washer 16, the washer and the set of legs being manufactured in the same material as the one of the set. The washer enables to retain the carrying element in the pedestal.

The carrying element is preferably made in polypropylene and by moulding. Polypropylene is generally used for manufacturing pedestals and offers the advantage of being cheap, humidity resistant and poorly sensible to temperature fluctuations.

Figure 4:
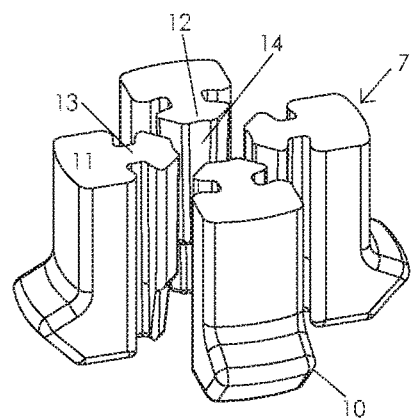
FIG. 4 shows a detailed view, at an enlarged scale, of a set of legs.
Figure 5:
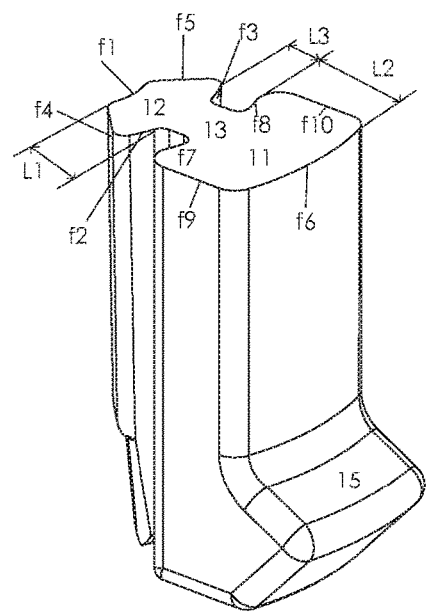
FIG. 5 shows, at an enlarged scale, a leg of a set of legs.

As illustrated in the FIGS. 4 and 5, each leg 10 comprises a base part 11 and a head part 12 connected to each other by an intermediate part 13. The head part 12 having a width L1 smaller than the one L2 of the base part 11. The head part having a width L1 larger than the one L3 of the intermediate part. The head part of each leg extends along of a circumference of the space 14, which extends in the extension of the perforation 8. In such a manner the head part can directly come in contact with a fixing screw (not shown in the drawings) which will be screwed in the perforation and will extend in that extension, as will be described in more details hereunder. Preferably each leg has a length situated between 0.7 and 1.2 cm, in particular 1 cm. This enables to have sufficient material present in which the fixing screw will be able to penetrate.

Preferably the head part 12 has a first circumference comprising a first segment f1 and a second segment f2. The first circumference also comprises a third segment f3. The first segment f1 faces the space 14 situated in the extension of the perforation 8. The first segment f1 has a curved profile, which matches the one of said space. A first end of the first segment f1 is connected by means of a first liaison segment f4 to the second segment f2. The first liaison segment f4 forms an obtuse angle with the first segment f1. A second end of the first segment f1, opposite to the first end, is connected to the third segment f3 by means of a second liaison element f5. The latter also forms an obtuse angle with the first segment f1. The obtuse angles enable the head part to have a surface which opens as from the first segment. The first and second liaison segments also form part of the circumference of the head part.

The first and the second end of the first segment are preferably rounded in order to facilitate a demoulding when manufacturing the carrying elements by moulding. The same applies to the ends of the second f2 and third f3 segment, which are connected by their respective liaison segment. The second and third segment also form a substantially right angle with the first f4, respectively the second f5, liaison segment.

The base part 11 preferably has a second circumference having a fourth segment f6 and a fifth segment f7. The second circumference also comprises a sixth segment f8. The fourth segment forms an external border of the leg. A first end of the fourth segment f6 is connected by means of a third liaison segment f9 to the fifth segment f7. The third liaison segment f9 forms a substantially right angle with the fourth segment f6. A second end of the fourth segment f6, opposite the first end, is connected to the sixth segment f8 by a fourth liaison segment f10. The latter also forms a substantially right angle with the fourth segment f6.

Just as for the head segment, the ends of the segments of the base part are preferably rounded for facilitating demoulding. The fifth and the sixth segments are preferably curved towards the interior of the base segment for rigidifying the structure of the base part and thus for enabling to increase the width of the intermediate part thereby giving it more stroke with respect to the base part. The base part serves essentially as support for the head part and is for that raison of a larger width than the one of the head part.

Preferably the base part has a foot 15, which extends as from the fourth segment f6. Preferably the foot comprises an angular extremity. The foot facilitates the entering of the leg into an opening of the pedestal, while mounting the carrying element on the pedestal.

For mounting the carrying element on the pedestal one will pass the set of legs into an opening foreseen in the support surface of the pedestal. The presence of the foot 15 facilitates this introduction as it contributes to bring the legs together among each other. The carrying element will be pushed into the opening of the pedestal until the washer 16 will be housed in this opening. For improving the fixing of the carrying element on the pedestal and thus prevent that strong wind blasts would remove that carrying element, a fixing screw will be introduced in the perforation 8. The fact that the fixing screw is screwed into the perforation will cause that this fixing screw will enter in contact with the head part 12 and more particularly with the first segment f1. The curved form of the first segment will facilitate the grip of the screw thread of the fixing screw with that first segment. The fact the first segment is connected to the intermediate segment 13 will cause that the first segment will be able to hinge with respect to the intermediate segment and thus enable the fixing screw to well anchor in that part head part. This good anchoring and the flexibility of the head part enable on their turn that the fixing screw will cause the legs to be spread with respect to the perforation and thus contribute to better retain the carrying element in the opening of the pedestal.

The invention claimed is:

1. Spacer parts carrying element provided for being detachably mounted on a pedestal for raising a surface, which carrying element comprises:
 a plate having an upper face and a lower face and a perforation extending perpendicularly through the plate from the upper face to the lower face,
 carrying element spacer parts on the upper face extending upwards from the upper face, each of the spacer parts provided for maintaining a distance between two adjacent tiles having two corners, respectively, supported by the pedestal, and
 a set of legs provided around the perforation by the lower face for gripping into an opening applied in a carrying surface of the pedestal, characterised in that each of the legs of said set comprises a base part and a head part connected to the base part by an intermediate part, the head part, intermediate part, and base part sequentially extending, respectively, in a direction substantially perpendicular to the perforation, each of the head part, intermediate part, and base part having a width, wherein the head part width is smaller than the width of the base part and larger than the width of the intermediate part, the head part having a length extending along a border of a space delimited by the set of legs and extending away from the perforation in the direction along which the perforation extends.

2. Spacer parts carrying element as claimed in claim 1, characterised in that
 the head part comprises a first circumference having a first segment, a second segment, a third segment, a first liaison, and a second liaison,
 the first segment faces said space and has a curved profile effecting a matching first profile of said space,
 a first end of said first segment is connected by the first liaison to the second segment, and a second end of the first segment, opposite the first end, is connected to the third segment by the second liaison.

3. Spacer parts carrying element as claimed in claim 2, characterised in that each of the first and second liaisons forms an obtuse angle with the first segment.

4. Spacer parts carrying element as claimed in claim 2, characterised in that each of the second and third segments forms a substantially right angle with each of the first and second liaisons, respectively.

5. Spacer parts carrying element as claimed in claim 2, characterised in that the first and second ends of the first segment are rounded.

6. Spacer parts carrying element as claimed in claim 1, characterised in that the base part comprises a second circumference having a fourth segment, a fifth segment, a sixth segment, a third liaison, and a fourth liaison, the fourth segment forms an exterior border of the leg, a first end of the fourth segment is connected by the third liaison to the fifth segment, and a second end of the fourth segment, opposite to the first end, is connected to the sixth segment by the fourth liaison.

7. Spacer parts carrying element as claimed in claim 2, characterised in that the base part comprises a second circumference having a fourth segment, a fifth segment, a sixth segment, a third liaison, and a fourth liaison, the fourth segment forms an exterior border of the leg, a first end of the fourth segment is connected by the third liaison to the fifth segment, and a second end of the fourth segment, opposite to the first end, is connected to the sixth segment by the fourth liaison.

8. Spacer parts carrying element as claimed in claim 7, characterised in that each leg has a length situated between 0.7 and 1.2 cm.

9. Spacer parts carrying element as claimed in claim 8, characterised in that the base part has a foot extending from the fourth segment.

10. Spacer parts carrying element as claimed in claim 9, characterised in that the foot comprises an angled endpoint.

11. Spacer parts carrying element as claimed in claim 1, characterised in that the set of legs is on a washer on the lower face, which washer and the set of legs are made of identical material.

12. Spacer parts carrying element as claimed in claim 8, characterized in that each leg has a length of 1 cm.

\* \* \* \* \*